(12) United States Patent
Sakaguchi

(10) Patent No.: US 6,603,492 B1
(45) Date of Patent: Aug. 5, 2003

(54) METHOD AND APPARATUS FOR GENERATING AND DISPLAYING A CONCEAL WINDOW

(75) Inventor: Akira Sakaguchi, fuchu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/572,395

(22) Filed: May 16, 2000

(30) Foreign Application Priority Data

May 24, 1999 (JP) .......................................... 11-142696

(51) Int. Cl.$^7$ ................................................. G09G 5/00
(52) U.S. Cl. ....................................... 345/791; 345/781
(58) Field of Search ................................. 345/764, 772, 345/809, 765, 767, 768, 781, 790–796, 802, 808

(56) References Cited

U.S. PATENT DOCUMENTS 5,528,744 A * 6/1996 Vaughton .................... 345/772
5,673,404 A * 9/1997 Cousins et al. ............. 345/809
5,838,336 A * 11/1998 Ross ........................... 345/536

FOREIGN PATENT DOCUMENTS

| EP | 910015 A1 | 4/1999 |
| JP | 01304529 | 12/1989 |
| JP | 01305750 | 12/1989 |
| JP | 2000-112727 | 4/2000 |

* cited by examiner

*Primary Examiner*—John Cabeca
*Assistant Examiner*—Brian Detwiler
(74) *Attorney, Agent, or Firm*—Louis J. Percello; F. Chau & Associates, LLP

(57) ABSTRACT

A method is provided to conceal the operating state of a predetermined application and to automatically perform a predetermined operation for the application. The method reduces the operating procedure control functions required of an operator and renders an operating environment that is intuitively understood.

13 Claims, 8 Drawing Sheets

```
<HTML><HEAD>
<SCRIPT LANGUAGE="JavaScript">
var bp = Packages.BackgroundPrint;

function print {                                    501
  bp.print(bp.NETSCAPE, bp.BROWSER_BOTTOM);
}
</SCRIPT></HEAD>
<BODY>
<A HREF="javascript:print()">
<IMG SRC="http:// ... /print.gif"></A>
</BODY></HTML>
```

```
import BackgroundPrint public class browserPrintTest {
  public static void main(String argv[]) {                                      501
    int rc = BackgroundPrint.print(BackgroundPrint.NETSCAPE, BackgroundPrint.BROWSER_TOP);
  }
}
```

```
<HTML><HEAD>
<SCRIPT LANGUAGE="JavaScript">
var bp = Packages.BackgroundPrint;

function autoPrint {
  Java Print process();      521
  bp.printDlgOk(500);
  }
</SCRIPT></HEAD>
<BODY>
<A HREF="javascript:autoPrint()">
<IMG SRC="http:// ... /autoPrint.gif"></A>
</BODY></HTML>
```

```
import BackgroundPrint public class browserPrintTest {
  public static void main(String argv[]) {
    Java Print process ();                      532
    int rc = BackgroundPrint.printDlgOk(500);
  }
}
```

METHOD AND APPARATUS FOR GENERATING AND DISPLAYING A CONCEAL WINDOW

BACKGROUND OF THE INVENTION

1. Field of the Invention

The present invention relates to a method for concealing the operating state of an application. More particularly, to a method for displaying a conceal window across a application window so as to render the operating state of the application window invisible to an operator.

2. Description of the Related Art

Typically, floor mounted multimedia stations, such as automated teller machines (ATMs), are operated by many users. These stations typically employ a small number of intuitive operations and procedures. However, as more services are added to these stations the complexity of operation increases. Those users unfamiliar with the operation of computers or particular applications may find that the added complexity is beyond their ability and prevents them from using the full potential of the station.

Other examples of floor mounted multimedia stations include: multimedia terminals installed along streets or in convenience stores, automated contracting machines in loan company and insurance company offices and photo-booths.

One example of an additional service in a floor mounted multimedia station is the incorporation of a web browser. However, if a web browser, such as the Netscape Communicator (a trademark of Netscape Corp.) or the Internet Explorer (a trademark of Microsoft Corp.), were to be introduced into one of the above floor mounted multimedia stations and its printing function were to be used, a common dialogue box (e.g., for the selection of a printer) may displayed in the opened Window.

In a situation where it is not necessary for print options to be set and only general printing processing is desired, using such a dialogue box can complicate the process. Therefore, a need exists for a system and method of concealing complex features in floor mounted multimedia stations. By concealing unnecessary operations the intuitive nature the stations can be maintained and improved even while providing additional and enhanced services.

SUMMARY OF THE INVENTION

It is, therefore, one object of the present invention to conceal the operating state of a predetermined application and to automatically perform a predetermined operation for the application.

It is another object of the present invention to provide a system that reduces the operating procedure control functions required of an operator, and that provides an operating environment that can be intuitively understood.

It is an additional object of the present invention to provide a system that reduces the number of applications running in the system and that has high level performance capabilities.

It is a further object of the present invention to provide a system that reduces the resources required for the execution of a program.

To achieve the above objects, according to one aspect of the present invention, the following procedures are executed.

According to one embodiment of the present invention, a temporary window is prepared and displayed in the foreground to prevent the re-drawing of a screen display. An application window (hereinafter referred to as a "target window") wherein a necessary operation is being performed is selected by using a caption. The target window is rendered active. A message for the execution of a predetermined operation is transmitted to the target window. The operating state of the application is monitored as needed, and upon the detection of a change in the state, a message is again transmitted. The performance of the processing is paused and is not resumed until the operation of the application has been terminated. A predetermined window, such as the window that was originally prepared in the foreground, is displayed in the foreground. The temporary window is erased.

According to another embodiment of the present invention, a display control method may be executed on a display control apparatus including an input device and a display screen for displaying an application window. The display control method generates and displays a conceal window in front of the application window in response to an entry by an operator at the input device. The display control method executes a predetermined operation in the application window while the conceal window is displayed in front of the application window. The method also erases the conceal window after the execution is complete.

A "conceal window" is not only a window in which the same image information is displayed as was input by an operator, so that the operating state of an application is concealed from the operator, but can also be a colored transparent or semi-transparent window through which the operator can ascertain that operation of the application is continuing in the background, and that for the current function no further control entries are required. A "predetermined operation" includes not only the execution of printing but also the execution all other application functions.

According to an additional aspect of the present invention, a display control method permits an operating system to generate a conceal window and to display the conceal window in the foreground in response to an entry by an operator at the input device. The method further transmits messages to the application while the conceal window is displayed in the foreground. The method permits the operating system to erase the conceal window after the transmitting step has been completed. The display control method executes on a display control apparatus including an input device and a display screen displaying the operating state of an application.

According to a further embodiment of the present invention, the application is a browser application, and the transmitted messages include a message instructing the reading of predetermined contents, a message instructing the printing of the contents, and a message issued in response to a print dialogue that is output during the printing.

According to one further embodiment of the present invention, a storage medium is provided for storing a display control software product, executed on a display A control apparatus including an input device and a display screen displaying an application window. The display control software product includes a program code for instructing the display control apparatus to generate and display a conceal window in front of the application window in response to an entry by an operator at the input device. The method includes a program code for instructing the display control apparatus to execute a predetermined operation in the application window while the conceal window is displayed in front of the application window. The method also includes a program code for instructing the display control apparatus to erase the conceal window after the instructing step has been completed.

According to yet another embodiment of the present invention, a storage medium is provided for storing a display control software product, executed on a display control apparatus including an input device and a display screen displaying the operating state of an application. The display control software product includes a program code for instructing the display control apparatus to generate and display a conceal window in the foreground in response to an entry by an operator at the input device. Further the method includes a program code for instructing the display control apparatus to transmit messages to the application while the conceal window is displayed in the foreground.

According to yet another embodiment of the present invention, a storage medium is provided for in which the application is a browser application, and the transmitted messages include a message instructing the reading of predetermined contents, a message instructing the printing of the predetermined contents, and a message issued in response to a print dialogue that is output during printing.

According to yet an additional embodiment of the present invention, a display control apparatus includes a first application for displaying a print button on the display screen, a second application including a printing function, a conceal window controller for permitting an operating system to generate a conceal window and to display the conceal window in the foreground when the print button is depressed in response to an entry by an operator at the input device, and a window message transmitter for transmitting a printing instruction message to the second application while the conceal window is displayed in the foreground. The apparatus includes an operating system for supporting the operating environment of an application, an input device and a display screen displaying the operating state of the application.

BRIEF DESCRIPTION OF THE DRAWINGS

The preferred embodiments are described with reference to the drawings wherein:

FIG. 8 is a diagram showing sample JavaScript code for executing the browser printing function according to one embodiment of the present invention;

FIG. 9 is a diagram showing sample Java code for executing the browser printing function according to one embodiment of the present invention;

FIG. 10 is a diagram showing sample JavaScript code for executing the automatic printing function according to one embodiment of the present invention; and FIG. 11 is a diagram showing sample Java code for executing the automatic printing function according to one embodiment of the present invention.

DETAILED DESCRIPTION OF THE PREFERRED EMBODIMENT

Figure 1:
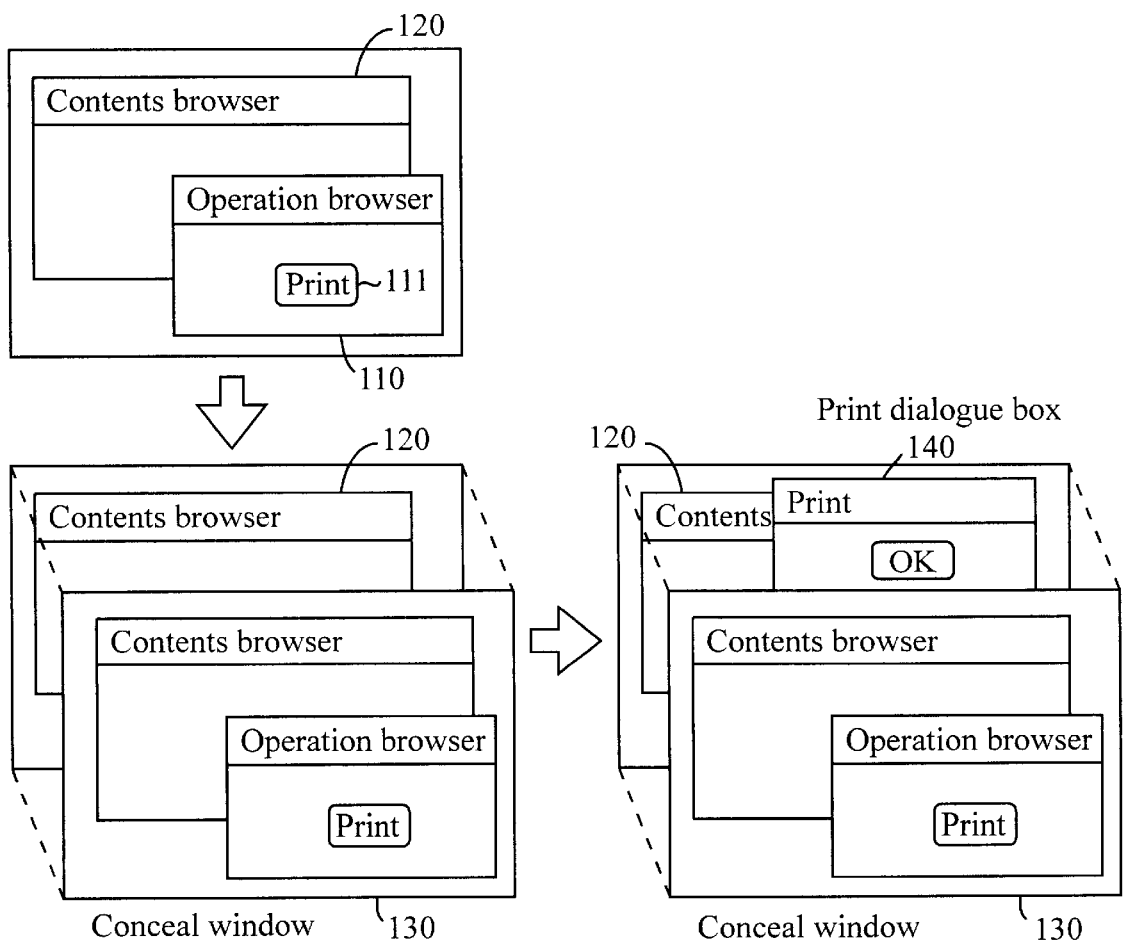
FIG. 1 is a diagram illustrating an operation of a conceal window according to one embodiment of the present invention.
Figure 2:
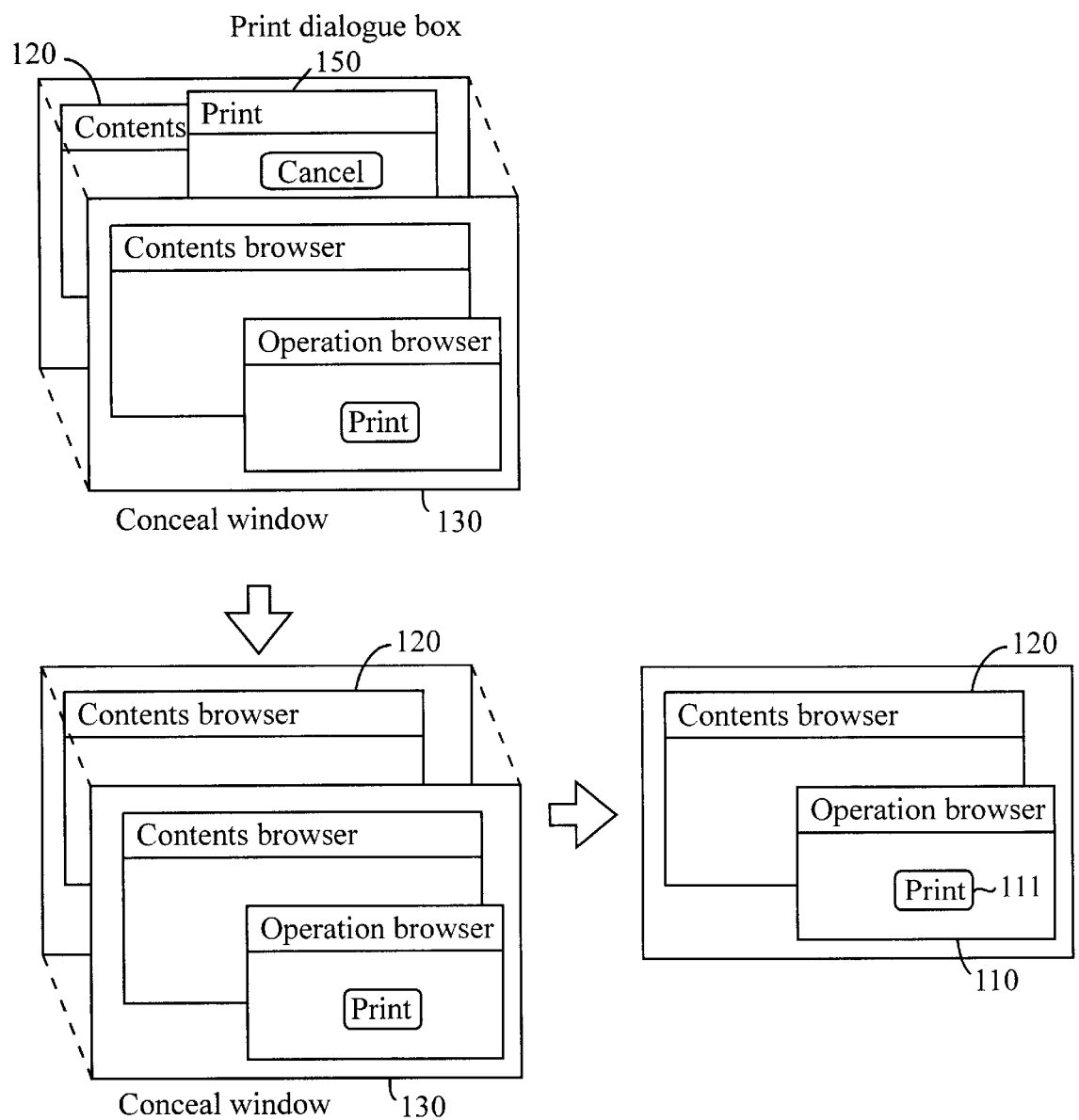
FIG. 2 is a diagram illustrating an operation of a conceal window according to one embodiment of the present invention.

FIGS. 1 and 2 are schematic diagrams illustrating one embodiment of the present invention. As is shown in FIG. 1, a print contents browser 120 and a print operation browser 110 are displayed on a display screen 101. When an operator selects a print button 111 on the print operation browser 110, a conceal window 130 is generated. In this embodiment of the present invention, an image obtained when the operator selects the print button 111 of the print operation browser 110 is displayed in the conceal window 130.

Data to be printed is loaded into the print contents browser 120, and is automatically printed. Since the conceal window 130 covers a print dialogue box 140 or a printing dialogue box 150 (FIG. 2) that is displayed during printing, these dialogue boxes are hidden from the operator.

When the printing process in the print contents browser 120 has been completed and the printing dialogue box 150 has been erased, the conceal window 130 is erased. In this manner, the operator is relieved of responsibility for the complicated operation performed in the print dialogue box 140.

Figure 3:
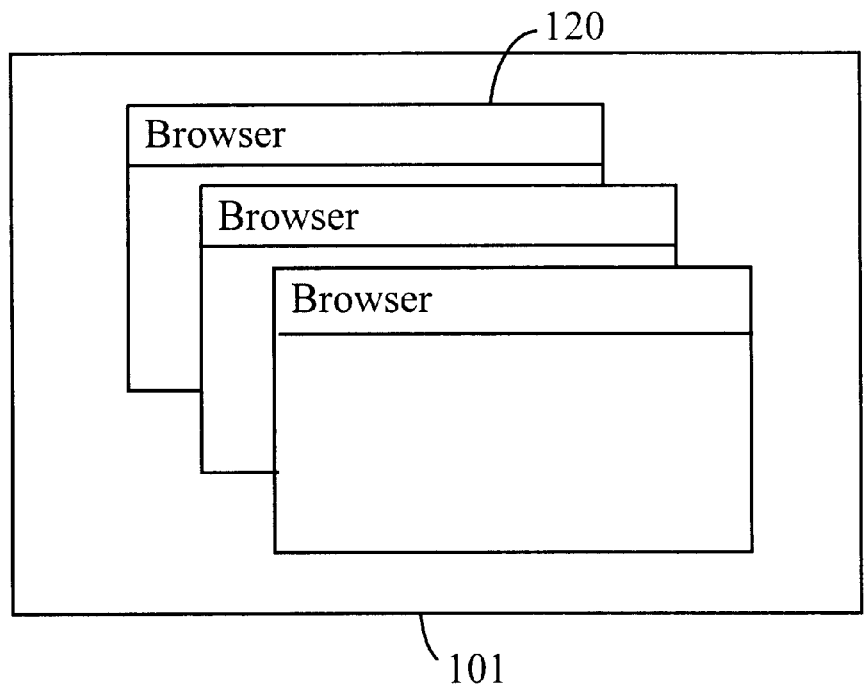
FIG. 3 is a diagram illustrating one embodiment of a conceal window according to the present invention.

In this embodiment of the present invention, when a plurality of print contents browsers exist, as is shown in FIG. 3, a specific browser can be selected to perform printing.

Figure 4:
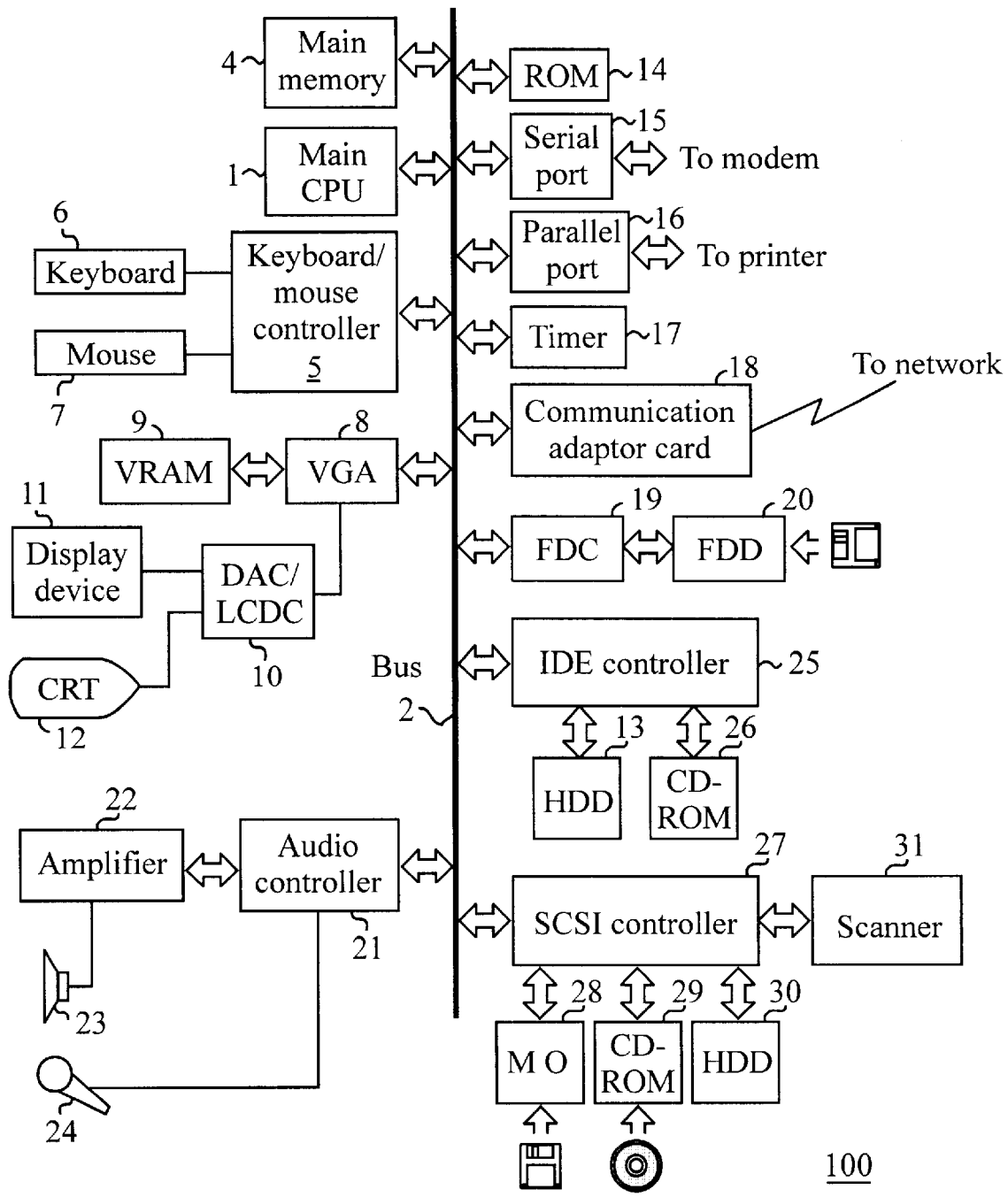
FIG. 4 is a block diagram illustrating the hardware arrangement according to one embodiment of the present invention.

FIG. 4 is a diagram showing a hardware arrangement of a display control apparatus 100 according to one embodiment of the present invention. Referring to FIG. 4, the display control apparatus 100 comprises a central processing apparatus (CPU) 1 and a memory 4. The CPU 1 and the memory 4 are connected by a bus 2 to hard disk drives 13 and 30, which are auxiliary storage devices. A floppy disk drive 20 (or a storage medium drive 26, 28, 29 or 30, such as an MO 28 or a CD-ROM 26 or 29) is connected to the bus 2 via a floppy disk controller 19 (or an IDE controller 25 or a SCSI controller 27).

A floppy disk (or another storage medium, such as an MO or a CD-ROM) is inserted into the floppy disk drive 20 (or into the storage medium driver 26, 28, 29 or 30, such as an MO and a CD-ROM), and code or data of a computer program, which interacts with an operating system and which issues instructions to the CPU 1 for carrying out the present invention, can be stored on the floppy disk or on the hard disk drive 13, or in a ROM 14. This computer program is executed by loading it into the memory 4. The code of the computer program can either be compressed, or can be divided into multiple segments for storage on multiple storage mediums.

The display control apparatus 100 further comprises user interface hardware components. These user interface hardware components include a pointing device 7 (a mouse, a joystick or a track ball) for entering screen location information; a keyboard 6 for entering data by using keys; and display devices 11 and 12 for providing visual data for a user. A loudspeaker 23 is used for receiving an audio signal from an audio controller 21 via an amplifier 22, and for outputting the signal as sound.

The display control apparatus 100 of the present invention can communicate with another computer via a serial port 15 and a modem, or via a communication adaptor 18, such as a token ring.

The present invention can be provided by a common personal computer (PC); by a workstation; by a computer incorporated in a television set, a facsimile machine or another electric home appliance; or by a combination of the components described above. It should be noted, however, that these components are merely examples, and that not all of them are required for the present invention. In particular, since the present invention is related to the control of the display of a predetermined operation performed by an application in order to render it visible or invisible to an operator, or to the control of an operator's access to ascertain the operational state of the application, the serial port 15, the communication adaptor 18, the audio controller 21, the amplifier 22 and the loudspeaker 23 are not necessarily required for the present invention.

A preferable operating system is, for example, Windows (a trademark of Microsoft) or the X-WINDOW system (a trademark of the X Consortium) on AIX (a trademark of IBM), one which supports a GUI multi-window environment; however, the operating system of the present invention is not specifically limited.

A system configuration of the present invention will now be described while referring to a block diagram in FIG. 5. In this embodiment, the display control apparatus 100 comprises: an input unit 201, an operating system 203, a printer 204, an output unit 205, a print operation web browser 207, a print contents web browser 208, a print flow controller 209, a JavaScript flow unit 210, a URL reader 211, a target window detector 212, a window message transmitter 213, a conceal window controller 215, a conceal window procedure 217, and a conceal window body 219.

The operating system 203 generates the conceal window 130, and outputs window messages to a predetermined application. Further, the operating system 203 transmits an entry by an operator, which is received from the input unit 201, to a predetermined application, and outputs information received from the application to the output unit 205. The input unit 201 receives an entry input by the use of a pointing device, such as a mouse, a joystick or a touch panel, or at a keyboard.

The printer 204 and the output unit 205 respectively convert print data and display data into predetermined formats. Provided for the print operation web browser 207 is the print button 111, and upon the depression of the print button 111 by an operator, the JavaScript flow unit 210 is activated and the procedures of the present invention are initiated.

The print contents web browser 208 loads data to be printed that it receives from a server across a network, and prints the data. The print flow controller 209 manages the target window detector 212, the window message transmitter 213 and the conceal window controller 215, and controls the procedures of the present invention.

The JavaScript flow unit 210 activates the print flow controller 209 and the URL reader 211, and transmits necessary information to the individual sections. The URL reader 211 receives from the JavaScript flow unit 210 information for the specification of data to be printed, and instructs the print contents web browser 208 to download data to be printed that is received from the server on the network.

The target window detector 212 specifies the using of the print contents web browser 208. The window message transmitter 213 transmits a window message to the print contents web browser 208. The conceal window controller 215 instructs the operating system 203 to generate or to erase the conceal window 130. The conceal window procedure 217 generates or erases the conceal window body 219 upon receiving an instruction from the operating system 203.

The conceal window body 219 is displayed in the foreground on the display screen, and conceals the print dialogue box 140 and the printing dialogue box 150. In this embodiment, the conceal window body 219 is provided as an executable (.exe) program written in the C language. Image information, substantially the same as that produced when the print button is selected, may be displayed in the conceal window body 219 so that an operator is not aware of what is taking place in the print dialogue box 140 or in the printing dialogue box 150. In addition, the conceal window body 219 may be a colored, transparent window or a semi-transparent window, so that the operator can ascertain that operations in the print dialogue box 140 and the printing dialogue box 150 are continuing in the background, and that for the operations no entries are required.

Figure 5:
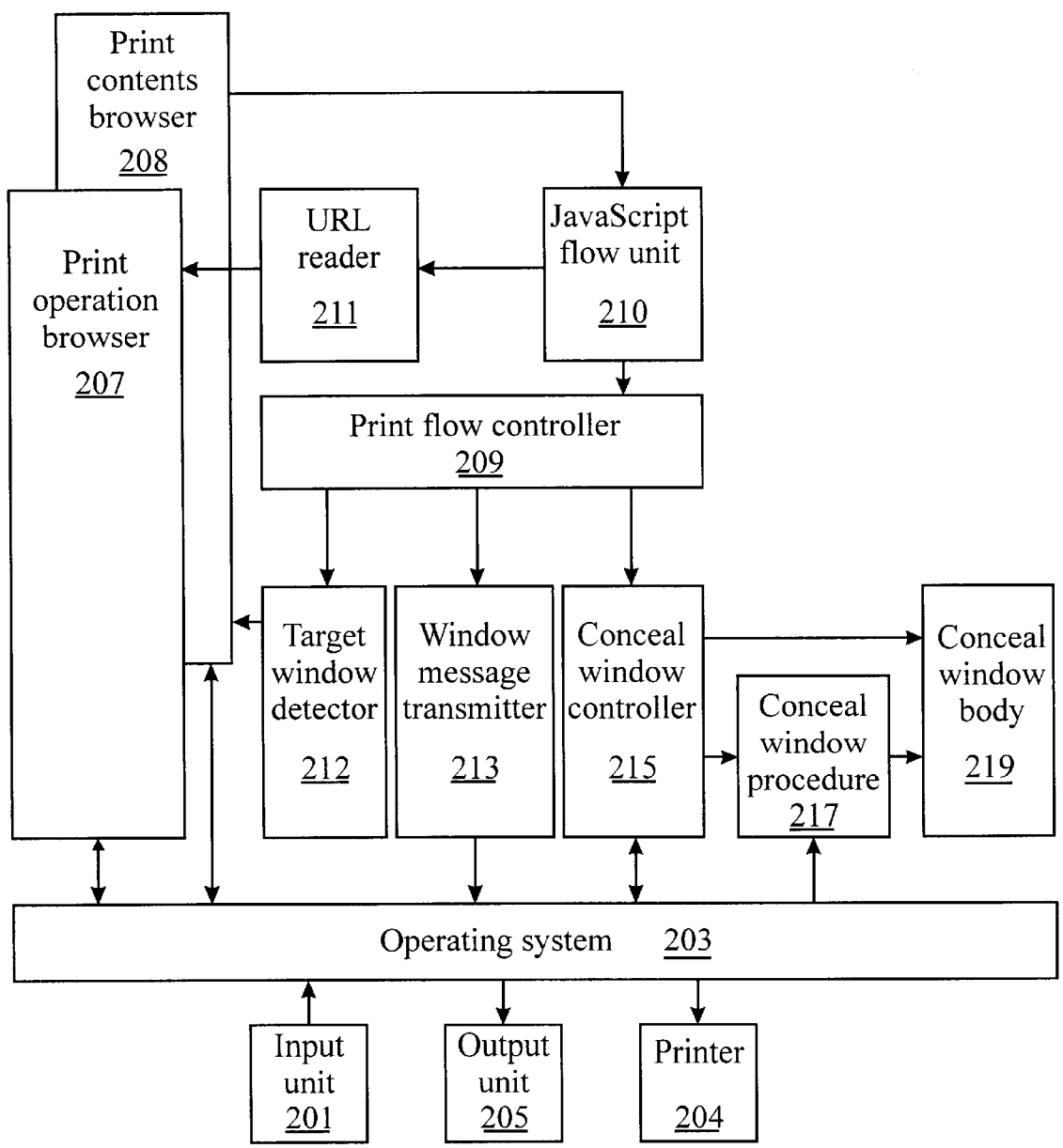
FIG. 5 is a block diagram illustrating individual components according to one embodiment of the present invention.

The functional blocks in FIG. 5 have been described. However, these functional blocks are logical functional blocks, and their functions are not meant to be carried out by individual sets of hardware or software, but can be provided by combined or common hardware and software.

Figure 6:
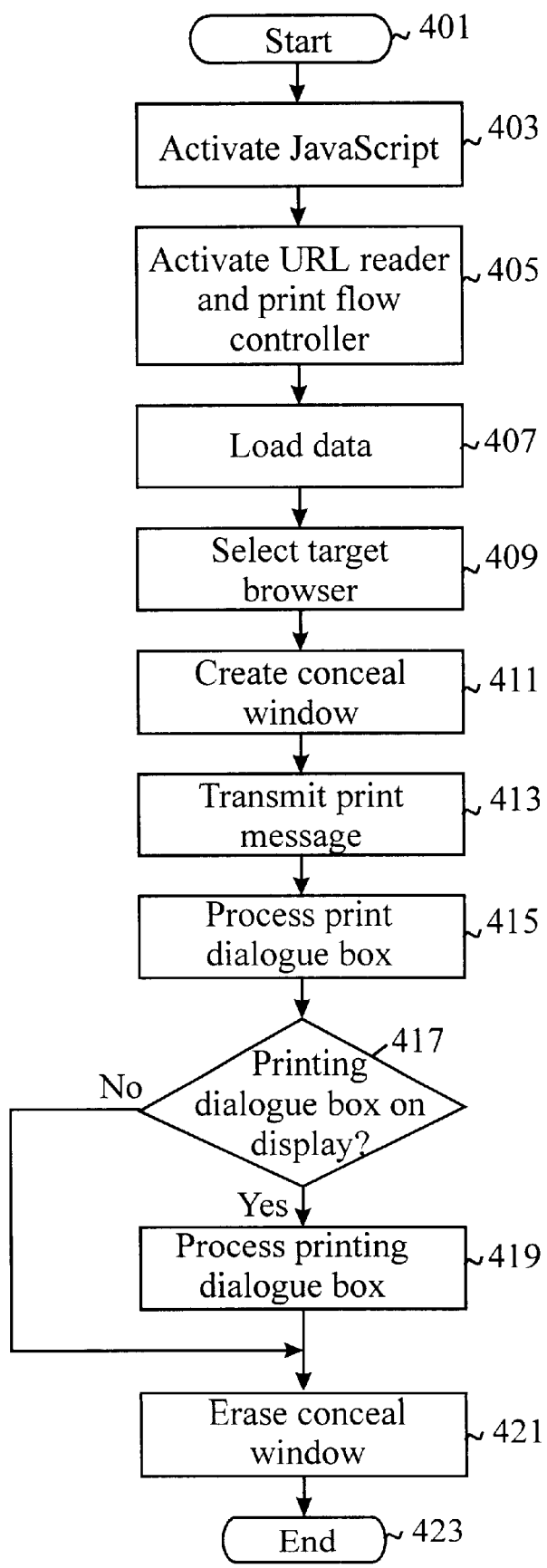
FIG. 6 is a flowchart showing the processing (browser printing function) performed for one embodiment of the present invention.

FIG. 6 is a flowchart showing processing performed for a preferred embodiment of the present invention. Referring to FIG. 6, when an operator instructs printing, the processing of the present invention is initiated (step 401). In this embodiment, when the operator selects the print button 111 in the print operation window 110 in FIG. 1 or 2, the JavaScript flow unit 210 is activated and the processing of the present invention is begun (steps 401 and 403).

The JavaScript flow unit 210 activates the URL reader 211 and the print flow controller 209 (step 405). When the print flow controller 209 is activated, the target window detector 212, the window message transmitter 213 and the conceal window controller 215 are also activated.

The URL reader 211 receives, from the JavaScript flow unit 210, information (URL, etc.) for downloading data and information for specifying a print contents browser 208 to load the data. The print contents browser 208 obtains information for loading the data, and loads the data for printing (step 407).

The target window detector 212 specifies a target print contents browser 208 for executing the printing function, and acquires a window handle (step 409). In this embodiment, for specifying the target browser 208 the target window detector 212 receives information via the JavaScript flow unit 210 and the print flow controller 209.

FIG. 8 is a diagram showing an example of coding according to one embodiment of the present invention when the browser printing function is called by the JavaScript flow unit 210. As is shown in FIG. 8, the browser type (Netscape Communicator, Internet Explorer, Adobe Acrobat Reader, etc.) is designated as a first parameter, and the Z order value (either the window in the foreground or the window in the background of the browser) of the window of the target browser is designated as the second parameter.

FIG. 9 is a diagram showing an example of coding according to one embodiment of the present invention when the browser printing function is called using Java code. Referring to FIG. 9, in accordance with the first and the second parameters, the target window detector 212 detects the target window for which the printing function is to be executed.

Upon receiving an instruction from the print flow controller 209, the conceal window controller 215 generates and displays a conceal window the size of the entire desktop screen in the foreground, and instructs the operating system 203 to maintain the display when the browser printing function is called (step 411). Thus, the conceal window body 219 and the conceal window procedure 217 are generated. In Windows (a trademark of Microsoft Corp.), this can be carried out by creating in WS_EX_TOPMOST a window having a designated window style.

After the conceal window has been generated, the print flow controller 209 transmits an instruction to the window message transmitter 213 to transmit, to the target browser 208, a unique Windows Message instructing the browser to execute the printing function (step 413). Since the Windows print dialogue box is displayed by the browser, the. processing is paused until the print dialogue box has been detected. When the print dialogue box has been detected, a Windows Message corresponding to OK is transmitted to the print dialogue box 140 (step 415).

Since the printing dialogue box 150 is displayed by some browsers, the processing is paused until a printing dialogue box is detected. When the printing dialogue box is detected, the processing is paused until the printing dialogue box 150 is erased (steps 417 and 419). Since during this period the conceal window 130 is displayed in the foreground, the print dialogue box 140 and the printing dialogue box 150 are invisible to the operator. When the printing dialogue box 150 is erased, the print flow controller 209 instructs the conceal window controller 215 to erase the conceal window 130. Thereafter, the conceal window controller 215 instructs the operating system 203 to erase the conceal window 130 (step 421).

Figure 7:
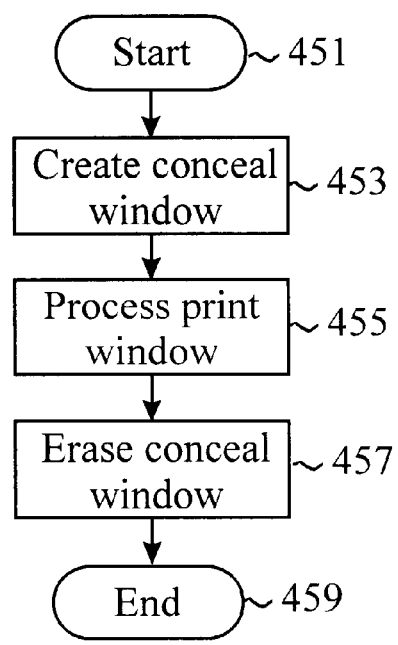
FIG. 7 is a flowchart showing the processing (automatic printing function) performed for one embodiment of the present invention.

FIG. 7 is a flowchart for processing according to one embodiment of the present invention, performed when the code to be printed is written in the Java language. Referring to FIG. 7, in this embodiment, as is shown in FIGS. 10 or 11, code to be printed is written in the Java language, and an automatic printing function is called. A standby time (in milliseconds) required before a print dialogue box is displayed is designated as the first parameter.

When the processing is begun, a conceal window the size of the entire desktop screen is generated and is displayed in the foreground, and when the browser printing function is called the display is maintained (step 453). In this embodiment, in Windows this can be carried out by creating in WS_EX_TOPMOST a window having a designated window style.

The processing is paused for the time designated by the first parameter, i.e., until the print dialogue box has been detected. When the print dialogue box has been detected, a Windows Message corresponding to OK is transmitted to the print dialogue box (step 455). It should be noted that the printing dialogue box is not displayed while the printing in the Java language is taking place. Thereafter, however, the conceal window is erased (step 457). Thus, in the period during which the conceal window is displayed, the print dialogue box is invisible for the operator.

In one embodiment of the present invention, a web browser is used as an application for instructing printing, and also as an application for actually performing the printing. However, the present invention is not limited to this embodiment, and the processes can be carried out by using one application to instruct printing, and another application to print data.

As is described above, according to one embodiment of the present invention, the operating state of a predetermined application can be concealed, and a predetermined operation for the application can be automatically performed, so that the operating procedure control functions required of an operator can be reduced and an operating environment that is intuitively understood can be provided.

What is claimed is:

1. A display control method, executed on a display control apparatus including an input device and a display screen displaying an application window comprising the steps of:
   (a) generating and displaying a conceal window in front of said application window in response to an entry by an operator at said input device, wherein said conceal window conceals an operating state of an application to be displayed in said application window;
   (b) executing a predetermined operation in said application window while said conceal window is displayed in front of said application window; and
   (c) erasing said conceal window after the step (b) has been completed,
   wherein the step of generating and displaying said conceal window comprises obtaining an image from said display screen, said image being displayed in said conceal window.

2. A display control method, executed on a display control apparatus including an input device and a display screen displaying the operating state of an application, comprising the steps of:
   (a) permitting an operating system to generate a conceal window and to display said conceal window in a foreground in response to an entry by an operator at said input device, wherein said conceal window conceals said operating state of said application to be displayed in said display screen;
   (b) transmitting messages to said application while said conceal window is displayed in said foreground; and
   (c) permitting said operating systems to erase said conceal window after said step (b) has be completed,
   wherein the step of permitting said operating system to generate said conceal window comprises obtaining an image from said display screen, said image being displayed in said conceal window.

3. The display control method according to claim 2, wherein said application is a browser application, and wherein said transmitted messages include a message instructing the reading of predetermined contents a message instructing the printing of said contents, and a message issued in response to a print dialogue that is output during said printing.

4. A storage medium storing a display control software product, executed on a display control apparatus including an input device and a display screen displaying an application window, said display control software product comprising:
   (a) program code for instructing said display control apparatus to generate and display a conceal window in front of said application window in response to an entry by an operator at said input device, wherein said conceal window conceals an operating state of an application to be displayed in said application window;
   (b) program code for instructing said display control apparatus to execute a predetermined operation in said application window while said conceal window is displayed in front of said application window; and
   (c) program code for instructing said display control apparatus to erase said conceal window after said step (b) has been completed,
   wherein generating and displaying said conceal window comprises obtaining an image from said display screen, said image being displayed in said conceal window.

5. A storage medium storing a display control software product, executed on a display control apparatus including an input device and a display screen displaying the operating state of an application, said display control software product further comprises:
(a) program code for instructing said display control apparatus to generate and display a conceal window in the foreground in response to an entry by an operator at said input device, wherein said conceal window conceals said operating state of said application to be displayed in said display screen; and
(b) program code for instructing said display control apparatus to transmit messages to said application while said conceal window is displayed in said foreground, wherein generating and displaying said conceal window comprises obtaining an image from said display screen, said image being displayed in said conceal window.

6. The storage medium according to claim 5, for which said application is a browser application, and for which said transmitted messages include a message instructing the reading of predetermined contents, a message instructing the printing of said predetermined contents, and a message issued in response to a print dialogue that is output during printing.

7. A display control apparatus, which includes an operating system for supporting the operating environment of an application, an input device and a display screen displaying the operating state of sa application, comprising:
(a) a first application window for displaying a print button on said display screen;
(b) a second application window including a printing function;
(c) a conceal window controller for permitting said operating system to generate a conceal window and to display said conceal window in the foreground when said print button is depressed in response to an entry by an operator at said input device, said conceal window concealing a dialog box generated in response to said depression of said print button, wherein said conceal window conceals said operating state of said application to be displayed in said display screen; and
(d) a window message transmitted for transmitting a printing instruction message to said second application window while said conceal window is displayed in said foreground.

8. The display control method of claim 1, wherein said image is a transparency.

9. The display control method of claim 1, wherein said application window does not appear in said image.

10. The display control method of claim 2, wherein said image is a transparency.

11. The storage medium storing a display control software product of claim 4, wherein the image is a transparency.

12. The storage medium storing a display control software product of claim 4, wherein said application window does not appear in said image.

13. The storage medium storing a display control software product of claim 5, wherein the image is a transparency.

* * * * *